Patented July 1, 1930

1,769,749

UNITED STATES PATENT OFFICE

CHESTER A. MITCHEL, OF CHICAGO, ILLINOIS, ASSIGNOR TO THE H. E. FREES CO., OF CHICAGO, ILLINOIS, A CORPORATION OF ILLINOIS

MANUFACTURE OF HOPPED, ALCOHOL REDUCED FERMENTED BEVERAGES

No Drawing.  Application filed July 30, 1928. Serial No. 296,429.

The present invention relates to improvements in the art of manufacturing hopped fermented beverages and particularly to such beverages of reduced alcohol content, and will be fully understood from the following description thereof.

In the manufacture of alcohol reduced fermented beverages it has hitherto been impossible to secure the full flavor and aroma of the hops employed in their manufacture, even to the extent previously secured in similar beverages retaining their full fermentation alcohol content. As a result, in order to secure even adequate hopped flavor and aroma in such alcohol reduced beverages, it has been necessary to use excessively large quantities of hops and the resulting flavor and aroma produced have not been satisfactory.

In accordance with the present invention, the full flavor and aroma of the hops are retained in the manufacture of alcohol reduced beverages, the quantity of hops necessary for producing adequate flavor and aroma is very substantially reduced and the character of the flavor and aroma produced is greatly enhanced. The invention is described hereinafter more particularly in connection with the manufacture of beverages of reduced alcohol content.

In carrying out the present invention, the necessary quantity of hops required for the brew is first subjected to steam distillation until the essential oils and other volatile constituents are removed. The essential oils and volatile constituents removed from the hops by this steam distillation are condensed and collected in the aqueous distillate.

In preparing the wort for the brew, the cereal grains, which may be malt alone or mixtures of malt with other grains is mashed with a suitable quantity of water at temperatures which will secure the desired proteolytic and diastatic enzyme actions as is well known in the art. Thus, the grains may be mashed for a period of about an hour at 30 to 32° R., and the temperature then raised to 60 to 61° R., at which temperature it may be held for another hour. The wort is then drawn off from the grains, which are sparged with sufficient water so that the sparged water, when added to the wort, will produce a total wort of a suitable concentration of solids, say 10 to 14% balling.

The hopped residue from the steam distillation operation is then admixed with the total wort, boiled for a suitable period to secure the extraction of the soluble constituents of the hops, say one hour, and then strained and cooled. The wort containing the extractives from the hops is then divided into two portions, a major proportion and a minor proportion, which bear a relation to each other determined by the percentage of alcohol desired or permitted in the final product. The major proportion of the wort is run to fermenters and fermented in the usual manner. After fermentation, it is dealcoholized in any suitable manner, preferably by boiling in vacuo, and the alcohol substantially completely reduced, this portion of the wort being very substantially reduced in volume in this operation, say to 45 to 60% of its original volume.

The separated minor proportion of the wort has added to it the essential oils and volatile constituents of the hops contained in the distillate collected from the steam distillation of the hops, and is then diluted with water to a sufficient extent so that, on fermentation, it may be directly added to the dealcoholized fermented portion of the wort and the mixture brought to the desired concentration of solids without exceeding the desired or legal alcohol limits. It will be apparent that the resulting beverage will contain all of the desirable constituents of the hops, both non-volatile and volatile and will have a full and adequate hop flavor and aroma.

The following description of an embodiment of the invention is intended to illustrate a specific method of carrying it into effect in a relatively simple brewing operation, and it is not intended that the invention shall be regarded as limited thereto, since the various operations may be varied as well known in the art while embodying the principles of the invention as set forth hereinbefore.

.75 to 1.0 lbs. of hops may be employed for each barrel of completed brew; thus, for a brew of 120 barrels, 90 lbs. of hops may be employed in the specific operation herein. The hops are subjected to steam distillation, as above set forth, and the distillate containing all the essential and volatile constituents collected.

The grains, which may be standard brewer's malt, are used in the proportions of about 50 lbs. to each barrel of final brew. The grains are mashed with about one-half barrel of water per 50 lbs. of malt, the water supplied being at a temperature of 33 to 35° R. so that when it is added, the temperature in the mash tun will be about 30 to 32° R. The mash is allowed to rest for about one hour at this temperature, is then heated while mixing to 60 to 61° R., and held at this point for about one hour. The wort is then run off, the grains charged with additional water, which is added to the wort drawn off so as to bring the total quantity of wort to a volume equivalent to that of the completed brew. This wort is then boiled with the hop residuum from the steam distillation operation for one hour, and strained and cooled. Assuming that the total wort has a volume of 120 barrels of 12% balling or thereabouts, 110 barrels of this is fermented and then dealcoholized, being reduced in the dealcoholizing process to about 60 barrels. The dealcoholized brew is cooled.

In the meantime, the distillate from the steam distillation of the hops which contains all of the volatile constituents and essential oils of the hops, is added to the remaining ten barrels of the wort and sufficient water is also added to reduce the solids to a point at which the liquid has a balling of about 2%. This diluted wort containing the volatile constituents of the hops is fermented. Drawn off from the yeast, and mixed with the dealcoholized brew from the major proportion of the wort. The mixed brew is then brought to the desired volume 120 barrels, the alcohol concentration of which is below one-half of 1%, and then may be filtered, and carbonated and packaged in the usual manner.

It is readily apparent that the invention may be employed in connection with the manufacture of fermented alcoholic beverages, in which no subsequent reduction of alcohol is effected the final fermentation step producing only a permissible proportion of alcohol. In such an operation the hops are first subjected to steam distillation in the manner hereinbefore set forth, and the hop residue is added to the beverage stock and boiled, as in the operation described above. The wort stock is then cooled, the essential oils and volatile constituents of the hops are added to it and it is fermented to a permissible alcohol content, stored and finished as is customary in the art.

I claim:
1. The method of producing a fully hopped, alcohol reduced fermented beverage which comprises removing the essential oils and volatile constituents from hops, separately collecting the thus removed constituents, preparing a cereal wort, boiling the said wort with the hopped residue, then dividing the wort into a major and a minor proportion, fermenting and dealcoholizing the major proportion of the wort, diluting and adding to the minor proportion of the wort the volatile oils and essential constituents removed from the hops, fermenting the diluted minor proportion of the wort and adding it to the dealcoholized major proportion of the wort said minor proportion being of such quantity that its alcohol content on complete fermentation does not increase the alcohol content of the entire beverage above the legally permissible limit.

2. The method of producing a fully hopped alcohol reduced fermented cereal beverage which comprises steam distilling hops to remove the volatile constituents and essential oils therefrom, collecting the distillate containing such constituents, producing a cereal wort, boiling the wort with the residue of the hops, separating the hopped wort into two portions, fermenting and dealcoholizing one portion of the wort, adding the distillate from the steam distillation of the hops to the other portion of the wort, fermenting the latter portion of the wort and admixing it with the dealcoholized fermented portion of the wort said minor proportion being of such quantity that its alcohol content on complete fermentation does not increase the alcohol content of the entire beverage above the legally permissible limit.

3. The method of producing a fully hopped, alcohol reduced fermented cereal beverage which comprises steam distilling hops in the proportion of .75 to 1.0 lbs. of hops per barrel of finished beverage, collecting the distillate containing the essential oils and volatile consituents of the hops, preparing a malted cereal wort of about 10 to 14% balling, boiling said wort with the hops, dividing said hopped wort into a major proportion of about eleven-twelfths and a minor proportion of about one-twelfth, fermenting and dealcoholizing the major proportion of the hopped wort, thereby reducing its volume, adding the distillate collected from the steam distillation of the hops to the minor proportion of the wort and diluting said minor proportion to a concentration of about 2% balling, fermenting the diluted minor proportion of the wort and adding the said fermented diluted wort to the dealcoholized major proportion of the fermented wort.

4. A fermented, alcohol reduced beverage of permissible alcohol content derived from a malted cereal wort containing the non-volatile extractions of hops accompanied by the entire essential oil and volatile constitutent content of the hops, the extractive matter from which is contained therein.

5. The method of producing a fully hopped fermented beverage which comprises distilling hops under partial pressures of the volatile constituents lower than atmospheric, collecting the distillate, heating the hop residues with a beverage stock, cooling and fermenting the stock to produce a permissible proportion of alcohol and adding to the cooled fermented stock the distillate from the hops.

In testimony whereof I have hereunto set my hand this 28th day of July, 1928.

CHESTER A. MITCHEL.